(12) United States Patent
Kawata

(10) Patent No.: US 6,455,798 B2
(45) Date of Patent: Sep. 24, 2002

(54) INDEX APPARATUS

(75) Inventor: Yasuyuki Kawata, Kyoto (JP)

(73) Assignee: Kawata Chuck Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/804,754

(22) Filed: Mar. 13, 2001

(30) Foreign Application Priority Data

Mar. 16, 2000 (JP) ........................................ 2000-074494

(51) Int. Cl.[7] .......................... B23H 11/00; B23Q 16/06
(52) U.S. Cl. ..................................... 219/69.2; 74/813 L
(58) Field of Search ........................... 74/813 R, 813 L, 74/814, 815, 816, 822, 823, 824, 826, 817; 219/69.11, 69.2

(56) References Cited

U.S. PATENT DOCUMENTS

| | | | | |
|---|---|---|---|---|
| 4,075,897 A | * | 2/1978 | Schmidt | 219/69.2 |
| 4,337,385 A | * | 6/1982 | Maropis et al. | 219/69.2 |
| 4,884,474 A | * | 12/1989 | Kawata | 74/813 L |
| 4,991,463 A | * | 2/1991 | Kawata | 74/817 |
| 5,136,896 A | * | 8/1992 | Burka | |
| 6,024,136 A | * | 2/2000 | Wada et al. | 74/813 L |
| 6,259,054 B1 | * | 7/2001 | Broadhead | |

* cited by examiner

Primary Examiner—Geoffrey S. Evans
(74) Attorney, Agent, or Firm—Kirschstein, et al.

(57) ABSTRACT

A machining center includes a spindle, a main table and an NC device for making a machining relative movement between the spindle and the main table. An index apparatus includes a housing mounted on the main table. An index table is supported on the housing for rotation. The apparatus further includes first and second push bars extending into the housing and outwardly of the housing for longitudinal movement, the NC device being arranged to make an extra relative movement between the spindle and the main table other than the machining relative movement, so that any one of the first and second push bars can be pushed and moved longitudinally thereof by the extra relative movement between the spindle and the main table. The apparatus further includes transmission apparatus received in the housing and disposed between the first and second push bars and the index table to rotate the index table in one direction in response to the longitudinal movement of the first push bar and in the reverse direction in response to the longitudinal movement of the second push bar.

8 Claims, 4 Drawing Sheets

INDEX APPARATUS

FIELD OF THE INVENTION

The invention relates to an index apparatus for an NC machine tool.

PRIOR ART

An index apparatus for an NC machine tool is disclosed in U.S. Pat. Nos. 4,884,474 and 4,991,463 to the inventor of the application. The NC machine tool includes a spindle, a main table and an NC device for making a machining relative movement between the spindle and the main table. The apparatus includes a housing mounted on the main table. The apparatus further includes an index table on which a work is held, the index table being supported on the housing for rotation. The apparatus is a push bar type which includes a single push bar extending into the housing and outwardly of the housing for longitudinal movement, the NC device being arranged to make an extra relative movement between the spindle and the main table other than the working relative movement, so that the single push bar can be pushed and moved longitudinally thereof by the extra relative movement between the spindle and the main table to rotate the index table in one direction when indexing the work.

The apparatus is advantageous in that it can index the work in accordance with the programming of the NC device, obtaining a high productivity. Unlike an electric, hydraulic or pneumatic type of index apparatus, the apparatus does not involve an electric, hydraulic or pneumatic drive means for rotating the index table, to be simple in structure and low in cost. It is not required to make an electric wiring, hydraulic piping or pneumatic piping on the main table. Accessories such as pallet changer can therefore installed at will without problem of space. As a result, the apparatus has been winning a high recognition up to the present on the market of NC machine tool.

However, the apparatus is questionable in that it can merely rotate the index table in one direction. The apparatus can not rotate the index table in the reverse direction to index the work, obstructing the operating efficiency. It is therefore desired to rotate the index table not only in one direction but also in the reverse direction to index the work, improving the operating efficiency.

It is therefore an object of the invention to provide a new push bar type of index apparatus which can rotate an index table not only in one direction but also in the reverse direction, to overcome the above problem.

SUMMARY OF THE INVENTION

According to the invention, there is provided an index apparatus for an NC machine tool, the NC machine tool including a spindle, a main table and an NC device for making a machining relative movement between the spindle and the main table.

The apparatus comprises a housing mounted on the main table. An index table is supported on the housing for rotation. The apparatus further comprises first and second push bars extending into the housing and outwardly of the housing for longitudinal movement, the NC device being arranged to make an extra relative movement between the spindle and the main table other than the machining relative movement, so that any one of the first and second push bars can be pushed and moved longitudinally thereof by the extra relative movement between the spindle and the main table.

The apparatus further comprises transmission means received in the housing and disposed between the first and second push bars and the index table to rotate the index table in one direction in response to the longitudinal movement of the first push bar and in the reverse direction in response to the longitudinal movement of the second push bar.

In a preferred embodiment, the NC machine tool comprises a machining center in which a work is held on the index table, a tool being held on the spindle. The NC device makes the machining relative movement between the spindle and the main table so that the work can be machined by the tool.

A work may be held not on the index table but on the spindle to be machined by a tool which is held on the index table.

The NC machine tool may comprise an electric discharge machine in which a work is held on the index table, electrically discharging means being held on the spindle. The NC device makes the machining relative movement between the spindle and the main table so that the work can be machined by the electrically discharging means.

The first and second push bars are fitted into first and second sleeves to extend parallel to each other for longitudinal movement. The first and second sleeves are disposed and fixed in the housing.

The apparatus further comprises spring means for resiliently urging the first and second push bars so that the first and second push bars can be returned by the spring means after the longitudinal movement, for reciprocating movement. The transmission means rotates the index table at an angle for one reciprocating movement of the first or second push bar.

The index table includes a shaft extending into the housing, the first and second push bars being disposed on the opposite sides of the shaft. The transmission means comprises first and second pawls extending inversely to each other and mounted on the first and second push bars. The transmission means further comprises a ratchet wheel including teeth and mounted on the shaft. The first or second pawl is engaged with one of the teeth of the ratchet wheel to rotate the ratchet wheel and index table in response to the longitudinal movement of the first or second push bar.

The apparatus further comprises a locking member for locking the index table from rotation. The apparatus further comprises unlocking means by which the locking member is moved to unlock the index table for rotation in accordance with the longitudinal movement of the first push bar when moved longitudinally thereof to a predetermined position. An auxiliary member is disposed between the first and second push bars so that the first push bar can be moved longitudinally thereof to the predetermined position by the auxiliary member in accordance with the longitudinal movement of the second push bar.

DETAILED DESCRIPTION OF THE PREFERRED EMBODIMENT

Figure 1:
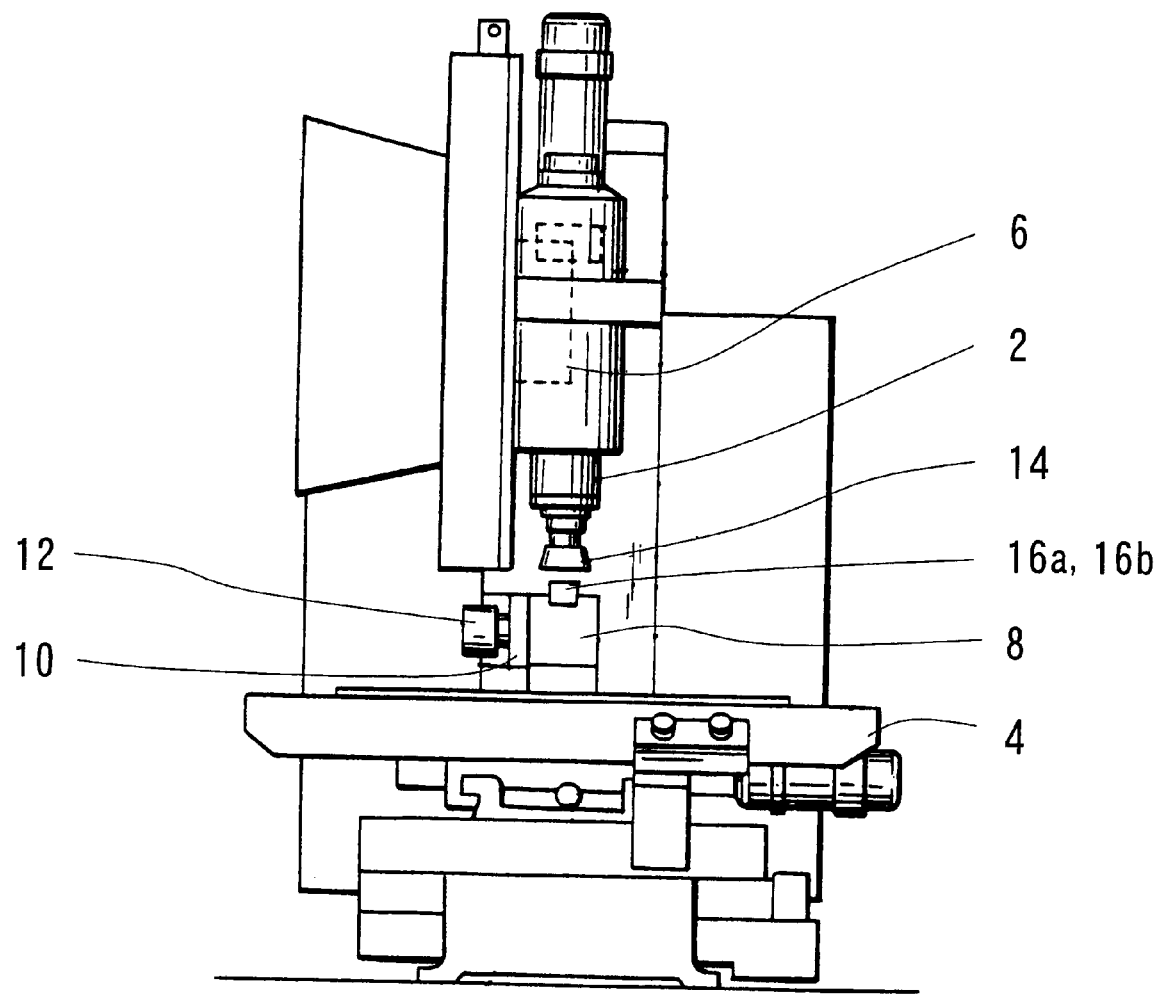
FIG. 1 is a side view of a preferred embodiment of the invention.

Referring now to the drawings, FIG. 1 illustrates an index apparatus for an NC machine tool according to the invention. The NC machine tool includes a spindle 2, a main table 4 and an NC device 6. The apparatus includes a housing 8 mounted on the main table 4. The apparatus further includes an index table 10 supported on the housing 8 for rotation. In the embodiment, the NC machine tool comprises a machining center in which a work 12 is fixed and held on the index table 10, a tool such as face cutter 14 being mounted and held on the spindle 2. The NC device 6 is intended to make a machining relative movement between the spindle 2 and the main table 4 so that the work 12 can be machined by the tool 14.

In addition, the NC device 6 is arranged to make an extra relative movement between the spindle 2 and the main table 4 other than the machining relative movement, as in the case of the above U.S. Patents. In this connection, the apparatus includes first and second push bars 16a and 16b extending into the housing 8 and outwardly of the housing 8 for longitudinal movement so that any one of the first and second push bars 16a and 16b can be pushed and moved longitudinally thereof by the extra relative movement between the spindle 2 and the main table 4. The apparatus further includes transmission means received in the housing 8 and disposed between the first and second push bars 16a and 16b and the index table 10 to rotate the index table 10 in one direction in response to the longitudinal movement of the first push bar 16a and in the reverse direction in response to the longitudinal movement of the second push bar 16b, as described later in detail.

Figure 2:
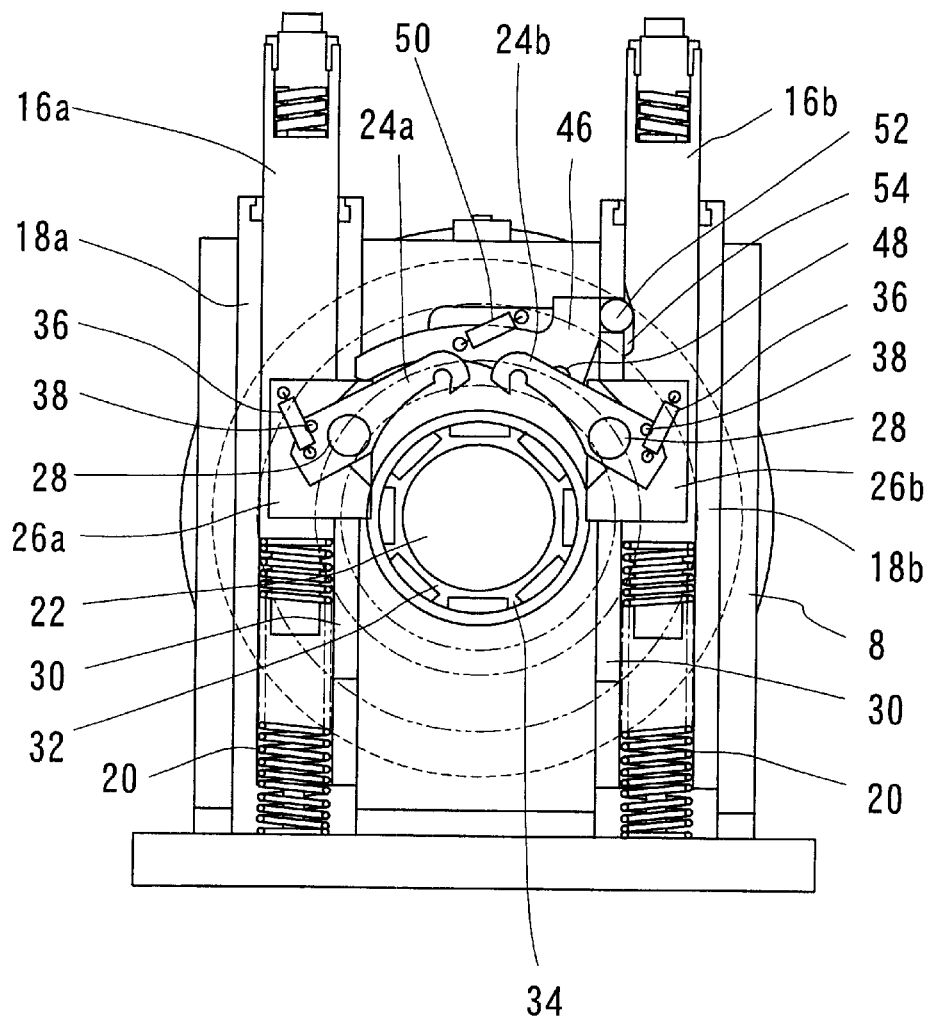
FIG. 2 is a cross sectional view of the apparatus of FIG. 1.

In the embodiment, the first and second push bars 16a and 16b are fitted into first and second sleeves 18a and 18b to extend vertically and parallel to each other for longitudinal movement, as shown in FIG. 2. The first and second sleeves 18a and 18b are disposed and fixed in the housing 8 so that the first and second push bars 16a and 16b extend outwardly and upwardly of the first and second sleeves 18a and 18b and the housing 8. The apparatus further includes spring means comprising springs 20 which are received in the first and second sleeves 18a and 18b for resiliently and upwardly urging the first and second push bars 16a and 16b.

The index table 10 includes a shaft 22 extending horizontally and into the housing 8, the first and second push bars 16a and 16b being disposed on the opposite sides of the shaft 22. The transmission means includes first and second pawls 24a and 24b extending inversely to each other and mounted on the first and second push bars 16a and 16b. In the embodiment, the first and second push bars 16a and 16b include first and second brackets 26a and 26b fixed thereto. The first and second brackets 26a and 26b have pins 28 formed thereon, the first and second pawls 24a and 24b being supported on the pins 28 for swinging movement to be mounted on the first and second push bars 16a and 16b. The sleeves 18a and 18b include slots 30 formed therein and extending axially of the sleeves 18a and 18b, the first and second pawls 24a and 24b and the first and second brackets 26a and 26b being inserted into the slots 30 to permit the longitudinal movement of the first and second push bars 16a and 16b.

The transmission means further includes a ratchet wheel 32 including teeth 34 and mounted on the shaft 22 of the index table 10, the first and second pawls 24a and 24b extending toward the middle between the first and second push bars 16a and 16b to be disposed over the ratchet wheel 32 and opposed to the teeth 34. In addition, the first and second brackets 26a and 26b are provided with springs 36 to resiliently urge the first pawl 24a clockwise about the pin 28 shown in FIG. 2 and the second pawl 24b counterclockwise about the pin 28. Stops 38 are formed on the first and second pawls 24a and 24b to be engaged with shoulders formed on the first and second brackets 26a and 26b by the springs 36 so that the first and second pawls 24a and 24b are held at positions shown in FIG. 2.

Figure 3:
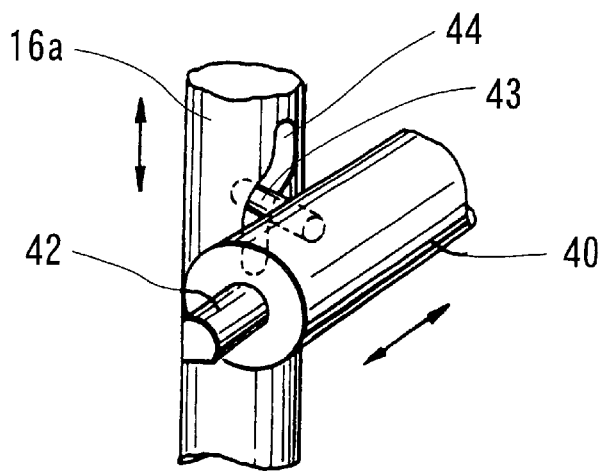
FIG. 3 is a perspective view showing the locking member for locking the index table from rotation in the apparatus of FIG. 1.

The apparatus further includes a locking member 40 comprising a rod and having an engaged portion 42 which is tooth-shaped to be engaged with a gear mounted on the index table 10 for locking the index table 10 from rotation, as shown in FIG. 3 and disclosed in the above U.S. Patents. The apparatus further includes unlocking means comprising a pin 43 which is formed on the locking member 40 and inserted into a cam groove 44 formed in the first push bar 16a. The cam groove 44 extends axially of the first push bar 16a to be inclined obliquely so that the locking member 40 can be pushed and moved axially thereof by the pin 43 and the cam groove 44, the tooth-shaped engaged portion 42 being disengaged from the gear of the index table 10, to unlock the index table 10 for rotation in accordance with the longitudinal movement of the first push bar 16a when moved longitudinally thereof to a predetermined position, as also disclosed in the above U.S. Patents.

In addition, the apparatus further includes an auxiliary member 46 disposed between the first and second push bars 16a and 16b. The auxiliary member 46 is lever-shaped and supported on a pin 48 for swinging movement. A spring 50 is stretched between the housing 8 and the auxiliary member 46 for resiliently urging the auxiliary member 46 clockwise about the pin 48 shown in FIG. 2 so that the auxiliary member 46 is engaged with and pressed against a ball 52 which is received in a radial hole formed in the second sleeve 18b. The ball 52 is pushed into a cam groove 54 formed in the second push bar 16b by the auxiliary member 46. The auxiliary member 46 extends toward the first push bar 16a to be opposed to the upper edge of the first bracket 26a.

In operation, the NC device 6 makes the extra relative movement between the spindle 2 and the main table 4 other than the machining relative movement so that any one of the first and second push bars 16a and 16b can be pushed and moved longitudinally thereof by the extra relative movement between the spindle 2 and the main table 4, as described above. In the embodiment, the tool 14 is moved downwardly by the extra relative movement between the spindle 2 and the main table 4 to be engaged with any one of the first and second push bars 16a and 16b. The first or second push bar 16a or 16b can therefore be pushed and moved downwardly by the tool 14.

As to the first push bar 16a, the locking member 40 is pushed and moved axially thereof by the pin 43 and the cam groove 44 in accordance with the downward or longitudinal movement of the first push bar 16a when moved downwardly to a predetermined position, as also described above. The tooth-shaped engaged portion 42 is therefore disengaged from the gear of the index table 10 to unlock the index table 10 for rotation.

Figure 4:
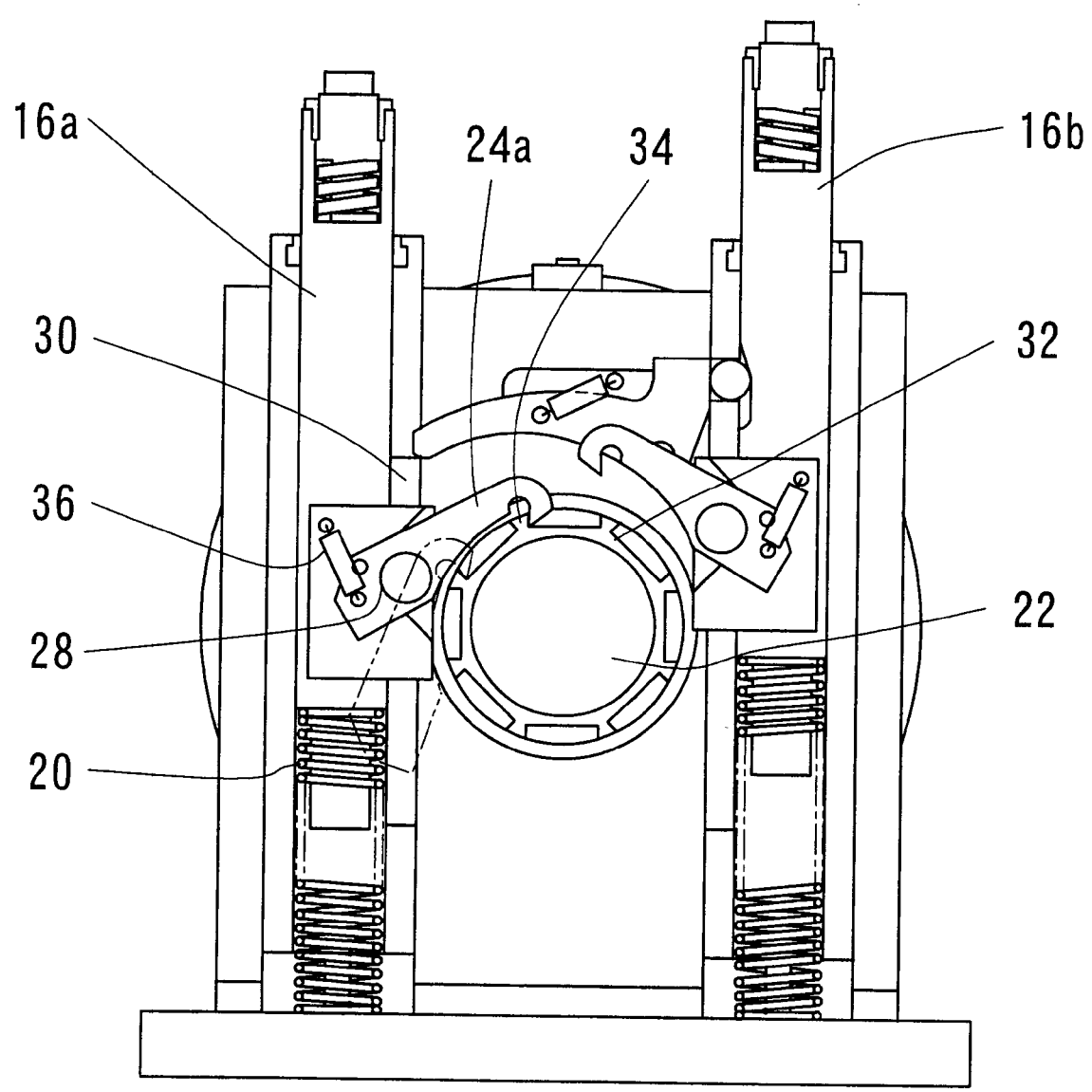
FIG. 4 is a cross sectional view showing the first push bar moved longitudinally thereof in the apparatus of FIG. 1.

The first push bar 16a is further moved downwardly so that the first pawl 24a is engaged with one of the teeth 34 of the ratchet wheel 32, as shown in FIG. 4. The tooth 34 is therefore pulled downwardly by the first pawl 24a which is swingingly moved counterclockwise about the pin 28 against the spring 36, to rotate the ratchet wheel 32 and the index table 10 counterclockwise about the shaft 22 in response to the downward or longitudinal movement of the first push bar 16a. Accordingly, the apparatus can rotate the index table 10 in one direction in response to the longitudinal movement of the first push bar 16a.

The tool 14 is then moved upwardly by the extra relative movement between the spindle 2 and the main table 4. The first push bar 16a is therefore moved upwardly to be returned by the spring 20 after the longitudinal movement, for reciprocating movement. Accordingly, the first pawl 24a is disengaged from the tooth 34 of the ratchet wheel 32 and then swingingly moved clockwise to be returned about the pin 28 by the spring 36. On the other hand, the locking member 40 is pushed and moved axially thereof by the pin 43 and the cam groove 44 so that the tooth-shaped engaged portion 42 is engaged with the gear of the index table 10 to lock the table 10 from rotation when the first push bar 16a is returned by the spring 20.

The first push bar 16a is moved downwardly and upwardly again and again. The first pawl 24a rotates the index table 10 at an angle for one reciprocating movement of the first push bar 16a, to thereby index the work 12 in accordance with the programming of the NC device 6.

Figure 5:
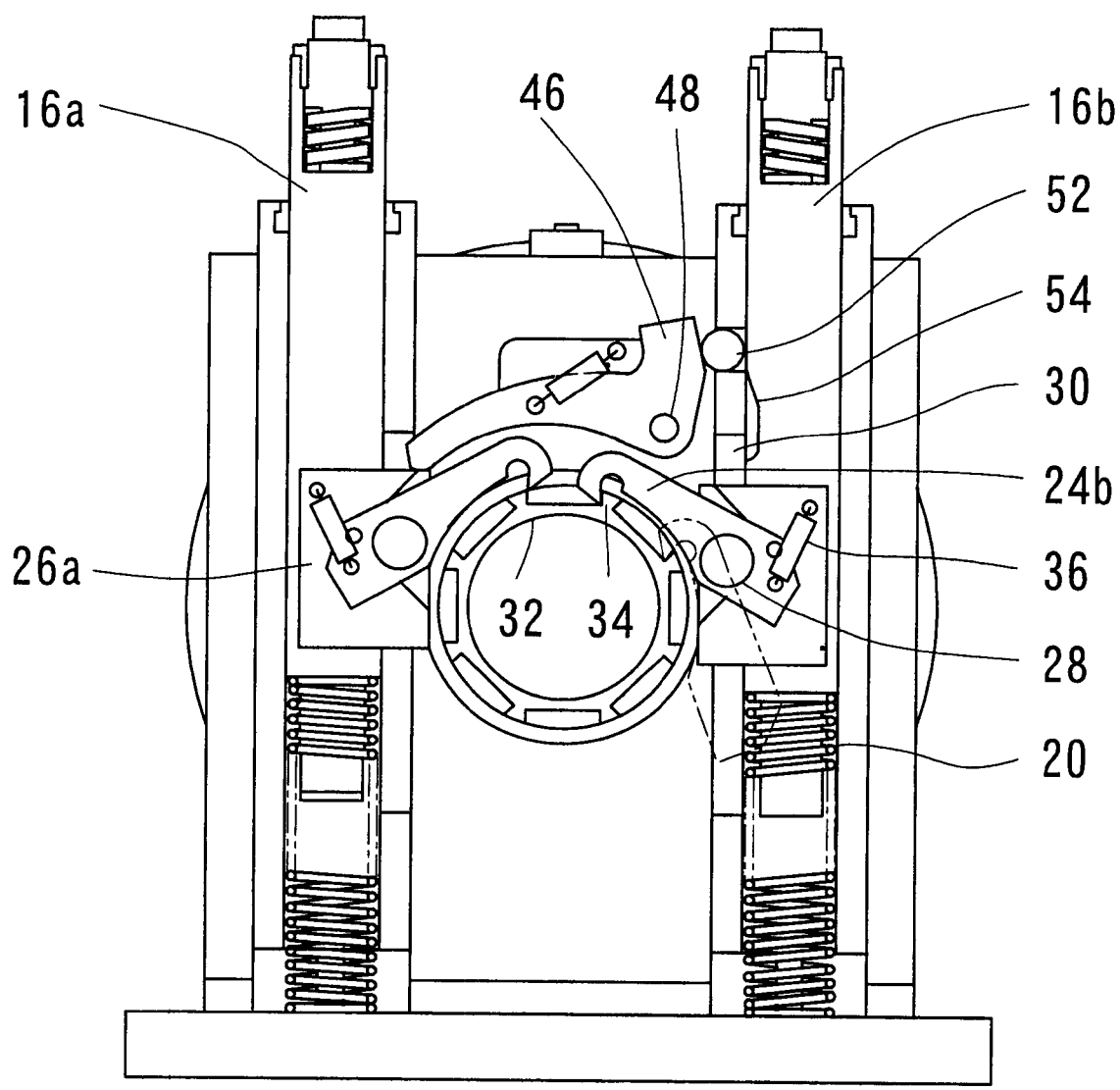
FIG. 5 is a cross sectional view showing the second push bar moved longitudinally thereof in the apparatus of FIG. 1.

As to the second push bar 16b, the ball 52 is pushed out of the cam groove 54 and pressed against the auxiliary member 46 by the second push bar 16b moved downwardly, as shown in FIG. 5. The auxiliary member 46 is therefore swingingly moved counterclockwise about the pin 48 against the spring 50 by the ball 52 to be engaged with the first bracket 26a so that the first bracket 26a and the first push bar 16a can be pushed and moved downwardly or longitudinally thereof to the predetermined position by the auxiliary member 46. The locking member 40 is therefore pushed and moved axially thereof by the pin 43 and the cam groove 44, the tooth-shaped engaged portion 42 being disengaged from the gear of the index table 10 to unlock the index table 10 for rotation.

The first push bar 16a is held at the predetermined position. The second push bar 16b is further moved downwardly so that the second pawl 24b is engaged with one of the teeth 34 of the ratchet wheel 32. The tooth 34 is therefore pulled downwardly by the second pawl 24b which is swingingly moved clockwise about the pin 28 against the spring 36, to rotate the ratchet wheel 32 and the index table 10 clockwise about the shaft 22 in response to the downward or longitudinal movement of the second push bar 16b. Accordingly, the apparatus can rotate the index table 10 in the reverse direction in response to the longitudinal movement of the second push bar 16b.

The tool 14 is then moved upwardly by the extra relative movement between the spindle 2 and the main table 4. The second push bar 16b is therefore moved upwardly to be returned by the spring 20 after the longitudinal movement, for reciprocating movement. Accordingly, the second pawl 24b is disengaged from the tooth 34 of the ratchet wheel 32 and then swingingly moved counterclockwise to be returned about the pin 28 by the spring 36. The ball 52 is pushed into the cam groove 54 by the auxiliary member 46 which is swingingly moved clockwise about the pin 48 by the spring 50. The first push bar 16a is therefore moved upwardly by the spring 20 so that the locking member 40 is pushed and moved axially thereof by the pin 43 and the cam groove 44 so that the tooth-shaped engaged portion 42 is engaged with the gear of the index table 10 to lock the table 10 from rotation.

The second push bar 16b is moved downwardly and upwardly again and again. The second pawl 24b rotates the index table 10 and the work 12 at an angle for one reciprocating movement of the second push bar 16b to thereby index the work 12, as in the case of the first pawl 24a.

Accordingly, the apparatus can rotate the index table 10 in one direction in response to the longitudinal movement of the first push bar 16a to index the work 12. In addition, the apparatus can rotate the index table 10 in the reverse direction in response to the longitudinal movement of the second push bar 16b to index the work 12. The apparatus is therefore convenient to index the work 12, improving the operating efficiency.

It should be understood that a work may be held not on the index table 10 but on the spindle 2 to be machined by a tool which is held on the index table 10. In the case, the apparatus can rotate the index table 10 not only in one direction but also in the reverse direction to index the tool.

The NC machine may comprise an electrical discharge machine in which a work is held on the index table, electrically discharging means being held on the spindle. The NC device makes the machining relative movement between the spindle and the main table so that the work can be machined by the electrically discharging means. In the case, the apparatus can rotate the index table not only in one direction but also in the reverse direction to index the work, as in the case of the embodiment of FIG. 1.

What is claimed is:

1. An index apparatus for an NC machine tool, said NC machine tool including a spindle, a main table and an NC device for making a machining relative movement between said spindle and said main table, said apparatus comprising:
    a housing mounted on said main table;
    an index table supported on said housing for rotation;
    first and second push bars extending into said housing and outwardly of said housing for longitudinal movement, said NC device being arranged to make an extra relative movement between said spindle and said main table other than said machining relative movement, so that any one of said first and second push bars can be pushed and moved longitudinally thereof by said extra relative movement; and
    transmission means received in said housing and disposed between said first and second push bars and said index table to rotate said index table in one direction in response to the longitudinal movement of said first push bar and in the reverse direction in response to the longitudinal movement of said second push bar.

2. The apparatus as set forth in claim 1 wherein said NC machine tool comprises a machining center in which a work is held on said index table, a tool being held on said spindle, said NC device making said machining relative movement between said spindle and said main table so that said work can be worked by said tool.

3. The apparatus as set forth in claim 1 wherein said NC machine tool comprises a machining center in which a work is held on said spindle, a tool being held on said index table, said NC device making said machining relative movement between said spindle and said main table so that said work can be worked by said tool.

4. The apparatus as set forth in claim 1 wherein said NC machine tool comprises an electrical discharge machine in which a work is held on said index table, electrically discharging means being held on said spindle, said NC device making said machining relative movement between said spindle and said main table so that said work can machined by said electrically discharging means.

5. The apparatus as set forth in claim 1 wherein said first and second push bars are fitted into first and second sleeves to extend parallel to each other for longitudinal movement, said first and second sleeves being disposed and fixed in said housing.

6. The apparatus as set forth in claim 5 further comprising spring means for resiliently urging said first and second push bars so that said first and second push bars can be returned by said spring after the longitudinal movement for reciprocating movement, said transmission means rotating said index table at an angle for one reciprocating movement of said first or second push bar.

7. The apparatus as set forth in claim 6 wherein said index table includes a shaft extending into said housing, said first and second push bars being disposed on the opposite sides of said shaft, said transmission means comprising first and second pawls extending inversely to each other and mounted on said first and second push bars, and a ratchet wheel including teeth and mounted on said shaft, said first or second pawl being engaged with one of said teeth of the ratchet wheel to rotate said ratchet wheel and said index table in response to the longitudinal movement of said first or second push bar.

8. The apparatus as set forth in claim 7 wherein further comprising a locking member for locking said index table from rotation, unlocking means by which said locking member is moved to unlock said index table for rotation in accordance with the longitudinal movement of said first push bar when moved longitudinally thereof to a predetermined position, and an auxiliary member disposed between said first and second push bars so that said first push bar can be moved longitudinally thereof to said predetermined position by said auxiliary member in accordance with the longitudinal movement of said second push bar.

* * * * *